(12) United States Patent
Murata

(10) Patent No.: US 10,452,331 B2
(45) Date of Patent: Oct. 22, 2019

(54) IMAGE FORMING APPARATUS, PRINT SYSTEM, AND PRINT METHOD

(71) Applicant: Sharp Kabushiki Kaisha, Sakai, Osaka (JP)

(72) Inventor: Ryohji Murata, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 15/648,523

(22) Filed: Jul. 13, 2017

(65) Prior Publication Data

US 2018/0032298 A1 Feb. 1, 2018

(30) Foreign Application Priority Data

Jul. 28, 2016 (JP) .................................. 2016-148349

(51) Int. Cl.
*G06F 3/12* (2006.01)
(52) U.S. Cl.
CPC .......... *G06F 3/1291* (2013.01); *G06F 3/1204* (2013.01); *G06F 3/1205* (2013.01); *G06F 3/126* (2013.01); *G06F 3/1226* (2013.01); *G06F 3/1267* (2013.01); *G06F 3/1268* (2013.01); *G06F 3/1287* (2013.01); *G06F 3/1292* (2013.01)

(58) Field of Classification Search
None
See application file for complete search history.

(56) References Cited

U.S. PATENT DOCUMENTS

| 2012/0212771 | A1* | 8/2012 | Goddard | G06F 3/1204 |
| | | | | 358/1.15 |
| 2015/0092221 | A1* | 4/2015 | Ochi | G06F 3/1222 |
| | | | | 358/1.14 |
| 2016/0011834 | A1* | 1/2016 | Hama | G06F 3/1208 |
| | | | | 358/1.15 |
| 2016/0313952 | A1* | 10/2016 | Kawasaki | G06F 3/1219 |

FOREIGN PATENT DOCUMENTS

JP 2012-039527 A 2/2012

* cited by examiner

*Primary Examiner* — Frantz Bataille
(74) *Attorney, Agent, or Firm* — Keating & Bennett, LLP

(57) ABSTRACT

When a print service is used in a print system, a user terminal transmits, to an image forming apparatus configured to be a sub apparatus, enquiry information to enquire of an Internet protocol (IP) address of an image forming apparatus configured to be a main apparatus. In response to the enquiry information from the user terminal, the sub apparatus transmits to the user terminal the IP address of the main apparatus stored on a memory of the sub apparatus.

11 Claims, 14 Drawing Sheets

| | PRINT JOB | | |
|---|---|---|---|
| TIME AND DATE | USER INFORMATION | | PRINT DATA |
| | USER ID | PASSWORD | |
| 2016 / 5 / 20 / 11:00 | ID001 | AAAAA | PRINT DATA D1 |
| | | | PRINT DATA D2 |
| | | | PRINT DATA D3 |
| 2016 / 5 / 20 / 12:00 | ID002 | BBBBB | PRINT DATA D10 |
| 2016 / 5 / 20 / 13:00 | ID003 | CCCCC | PRINT DATA D20 |
| ⋮ | ⋮ | ⋮ | ⋮ |

1210

| MFP (MODEL) | IP ADDRESS | PRINT FUNCTION |
|---|---|---|
| MAIN APPARATUS (MFP100) | 192.168.11.100 | MONOCHROME, COLOR, ... |
| SUB APPARATUS (MFP200A) | 192.168.21.11 | MONOCHROME |
| SUB APPARATUS (MFP200B) | 192.168.11.12 | MONOCHROME, COLOR, SADDLE STITCH BINDING |
| SUB APPARATUS (MFP200C) | 192.168.11.13 | MONOCHROME, FINISHER |

IMAGE FORMING APPARATUS, PRINT SYSTEM, AND PRINT METHOD

BACKGROUND

1. Field

The present disclosure relates to an image forming apparatus, a print system, and a print method for providing a print service.

2. Description of the Related Art

Japanese Unexamined Patent Application Publication No. 2012-39527 discloses a system in which multiple image forming apparatuses and a user terminal are connected to each other through a network. Another developed print system includes multiple image forming apparatuses and a user terminal, connected to each other through a network, and provides a print service. In the print service, the user terminal transmits, to an image forming apparatus configured to be a main apparatus from among the image forming apparatuses, a print job in accordance with identification information (IP address) of the main apparatus, and the main apparatus stores the print job from the user terminal. An image forming apparatus, configured to be a sub apparatus, from among the image forming apparatuses performs the print job stored on the main apparatus.

The user may use the print service if he or she recognizes which image forming apparatus is the main apparatus in the network environment. In order to store a print job on the main apparatus through the print service, the user causes the user terminal to display a list of the multiple image forming apparatuses, and transmits user information and print data to an image forming apparatus configured to be the main apparatus from among the image forming apparatuses. The main apparatus stores as a print job the user information and print data from the user terminal. In order to perform the print job on a sub apparatus through the print job, the user then moves to the location where the sub apparatus is installed, and logs in on the main apparatus from the sub apparatus. In this case, the sub apparatus acquires from the main apparatus the print job which has matched user information. The user issues a print command to perform the print job, and the sub apparatus prints the print data in response to the print command. In an authentication operation, the sub apparatus logs in on the main apparatus. If an authentication server is separately included, both the main apparatus and the sub apparatus may use the authentication server. If an authentication operation is performed within a multifunction peripheral/printer (MFP), the same authentication table may be configured in both the main apparatus and the sub apparatus.

In the network environment, however, the user may not necessarily recognize which image forming apparatus is a main apparatus. In the case described below, for example, the user is unable to use the print service.

The user terminal (portable terminal) establishes connection with the sub apparatus by authenticating an access point with a service set identifier (SSID). The sub apparatus is connected to the main apparatus via the access point and a router. In this case, through broadcasting, the user terminal performs automatic search to determine whether an image forming apparatus is present over the same network. Although the sub apparatus is present between the user terminal and the router, the main apparatus is not present. The automatic search finds the sub apparatus but does not find a main apparatus. More specifically, the user causes the user terminal to display a list of image forming apparatuses, and the image forming apparatus configured to be the main apparatus is not included in the list. In this state, the user is unable to use the print service.

SUMMARY

It is desirable to provide an image forming apparatus that is used in a print system that provides a print service in which even if a user does not recognize a network environment, a user terminal transmits, to an image forming apparatus configured to be a main apparatus from among multiple image forming apparatuses, a print job in accordance with identification information of the main apparatus, the main apparatus stores the print job from the user terminal, and an image forming apparatus configured to be a sub apparatus performs the print job stored on the main apparatus.

According to an aspect of the disclosure, there is provided an image forming apparatus configured to be a sub apparatus in a print system. The print system provides a print service and includes a user terminal and a plurality of image forming apparatuses, connected to a network. The user terminal transmits to an image forming apparatus configured to be a main apparatus a print job in accordance with identification information of the main apparatus from among the image forming apparatuses. The main apparatus stores the print job from the user terminal. The image forming apparatus configured to be the sub apparatus from among the image forming apparatuses performs the print job stored on the main apparatus. The sub apparatus includes an identification information configuration memory that stores the identification information, and an identification information transmission control unit that transmits to the user terminal the identification information stored on the identification information configuration memory when the print service is used.

According to another aspect of the disclosure, there is provided a print system providing a print service and including a user terminal and a plurality of image forming apparatuses, connected to a network. The user terminal transmits to an image forming apparatus configured to be a main apparatus a print job in accordance with identification information of the main apparatus from among the image forming apparatuses. The main apparatus stores the print job from the user terminal. An image forming apparatus configured to be a sub apparatus from among the image forming apparatus performs the print job stored on the main apparatuses. The sub apparatus includes an identification information configuration memory that stores the identification information, and an identification information transmission control unit that transmits to the user terminal the identification information stored on the identification information configuration memory when the print service is used.

According to another aspect of the disclosure, there is provided a print method of a print system providing a print service and including a user terminal and a plurality of image forming apparatuses, connected to a network. The user terminal transmits to an image forming apparatus configured to be a main apparatus a print job in accordance with identification information of the main apparatus from among the image forming apparatuses. The main apparatus stores the print job from the user terminal. An image forming apparatus configured to be a sub apparatus from among the image forming apparatus performs the print job stored on the main apparatus. The print method includes storing the identification information of the main apparatus, and transmitting to the user terminal the stored identification information when the print service is used.

DESCRIPTION OF THE EMBODIMENTS

Embodiments of the disclosure are described in detail below with reference to the drawings. In the discussion that follows, the print system of each embodiment of the disclosure is described. The embodiments serve as an example of the disclosure, and the disclosure is not limited to the contents of the embodiments.

1. First Embodiment 1.1 General Configuration

Figure 1:
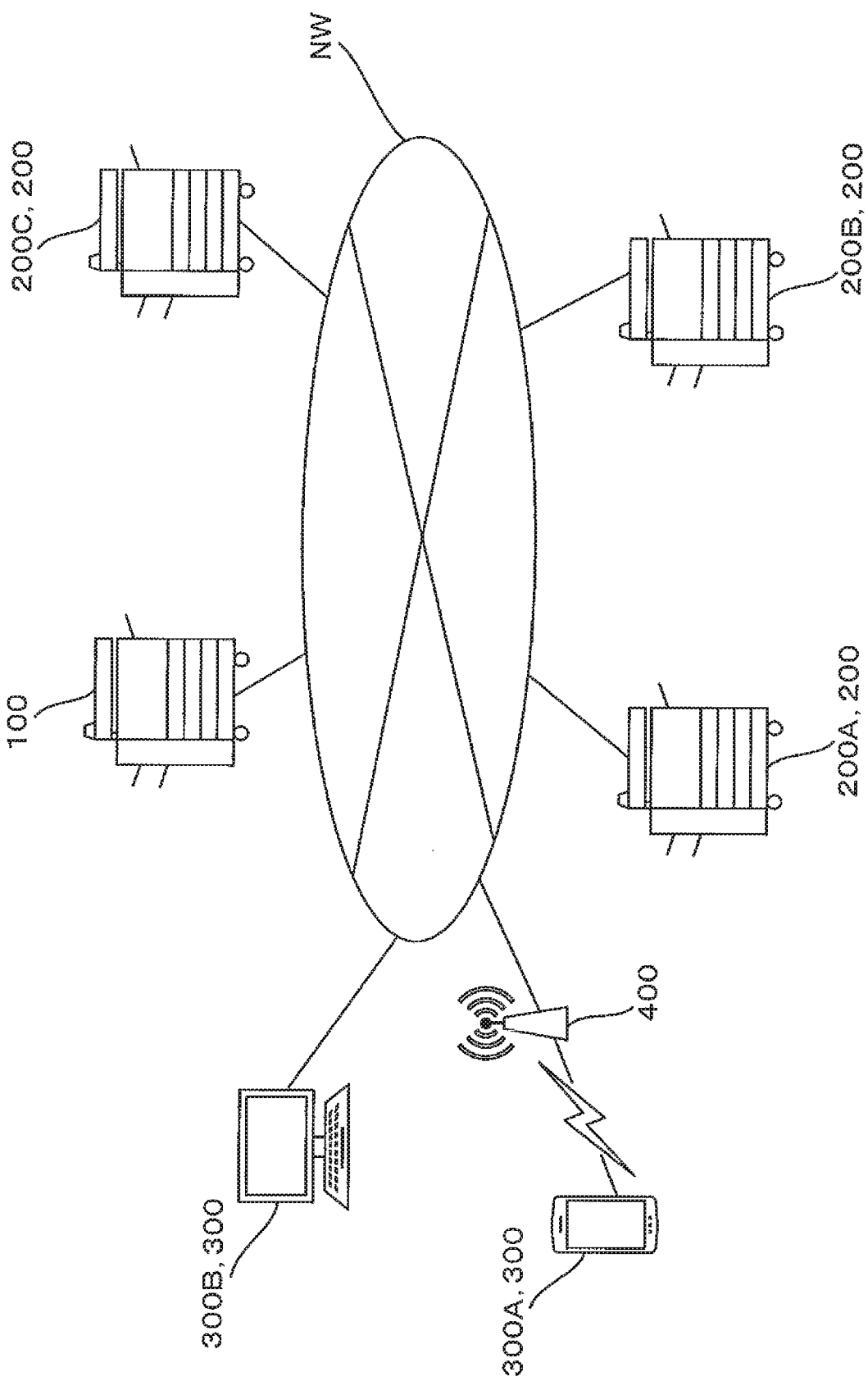
FIG. 1 generally illustrates a print system of a first embodiment.

FIG. 1 generally illustrates a print system of a first embodiment. The print system includes multiple multifunction peripherals/printers (MFPs) 100 and 200 serving as image forming apparatuses, and a user terminal 300. The MFPs and the user terminal 300 are interconnected to each other via a network (NW).

The user terminal 300 may be a portable terminal 300A, or a personal computer (PC) 300B. The portable terminal 300A is connected to a network NW via an access point 400. The portable terminal 300A instructs a print job to be performed, using an application. The PC 300B instructs a print job to be performed, using a printer driver. A user transmits to one of MFPs 100 and 200 a print command to print print data, using the user terminal 300 (the portable terminal 300A, for example). In this case, the one MFP prints the print data in response to the print command.

A print service is performed in the print system of the first embodiment. In the print service, the user terminal 300 transmits a print job to one of the MFPs 100 and 200, which is configured to be a main apparatus, in accordance with identification information (IP address) of the main apparatus. The MFP 100 (main apparatus) stores the print job. The MFP 200, configured to be a sub apparatus, from among the MFPs 100 and 200, performs the print job stored on the MFP 100 (main apparatus).

Referring to FIG. 1, one MFP 100 from among the MFPs 100 and 200 is configured to be the main apparatus and the remaining apparatuses 200 other than the MFP 100 are configured to be sub apparatuses. As illustrated in FIG. 1, three MFPs 200 are included as sub apparatuses and respectively referred to as MFP 200A, MFP 200B, and MFP 200C.

1.2 Concept

Figure 2:
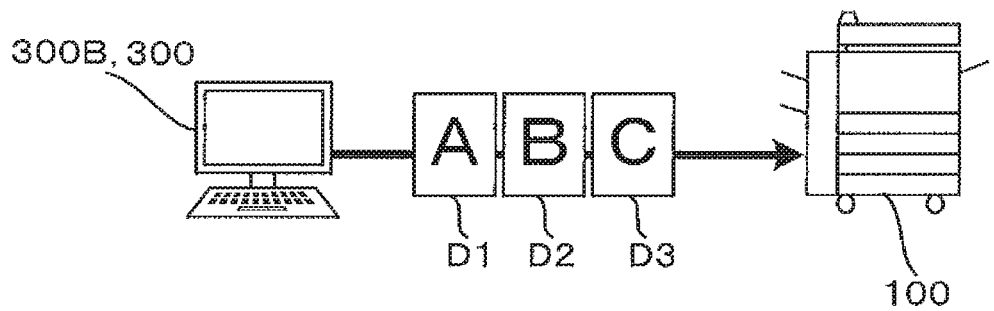
FIG. 2 illustrates a print service.
Figure 3:
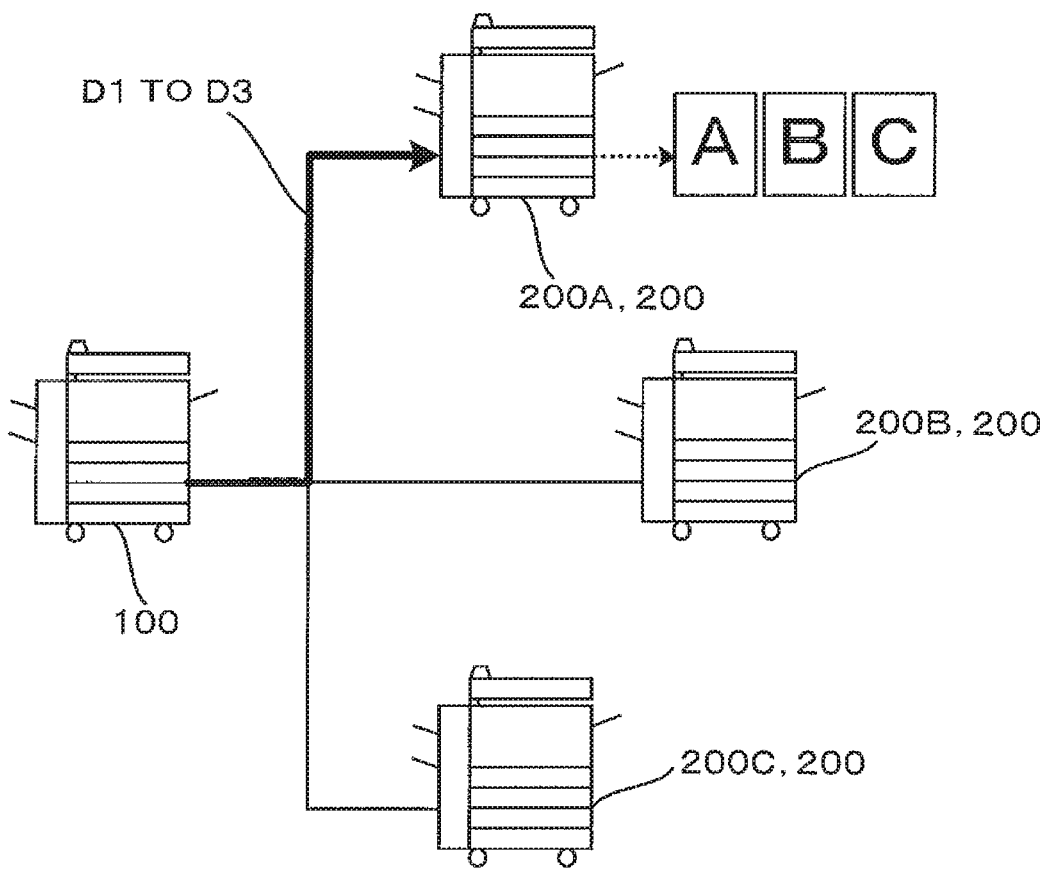
FIG. 3 illustrates the print service.

FIGS. 2 and 3 illustrate the print service. If the user recognizes which MFP is a main apparatus in the network environment, the user is able to use the print service.

In order to store the print job on the main apparatus through the print service as illustrated in FIG. 2, the user uses the user terminal 300 (such as PC 300B) to display a list of the MFPs 100 and 200 thereon, and then transmits user information and print data D1, D2, and D3 to the MFP 100 (main apparatus) from among the MFPs 100 and 200. The MFP 100 (main apparatus) stores the user information and the print data D1, D2, and D3 from the PC 300B as the print job.

In order to perform the print job on the sub apparatus through the print service, the user moves to the location where the MFP 200A (sub apparatus) is installed, and logs in on the MFP 100 (main apparatus) from the MFP 200A (sub apparatus). In this case, the MFP 200A (sub apparatus) acquires from the MFP 100 (main apparatus) the print job having the matched user information. The user issues a print command to perform the print job. As illustrated in FIG. 3, the MFP 200A (sub apparatus) prints the print data D1, D2, and D3 in response to the print command. In an authentication operation, the sub apparatus logs in on the main apparatus. The disclosure is not limited to this method. If an authentication server is separately included, each of the main apparatus and the sub apparatus may use the authentication server. If the authentication operation is performed within the MFP, the same authentication table may be configured in both the main apparatus and the sub apparatus.

Figure 4:
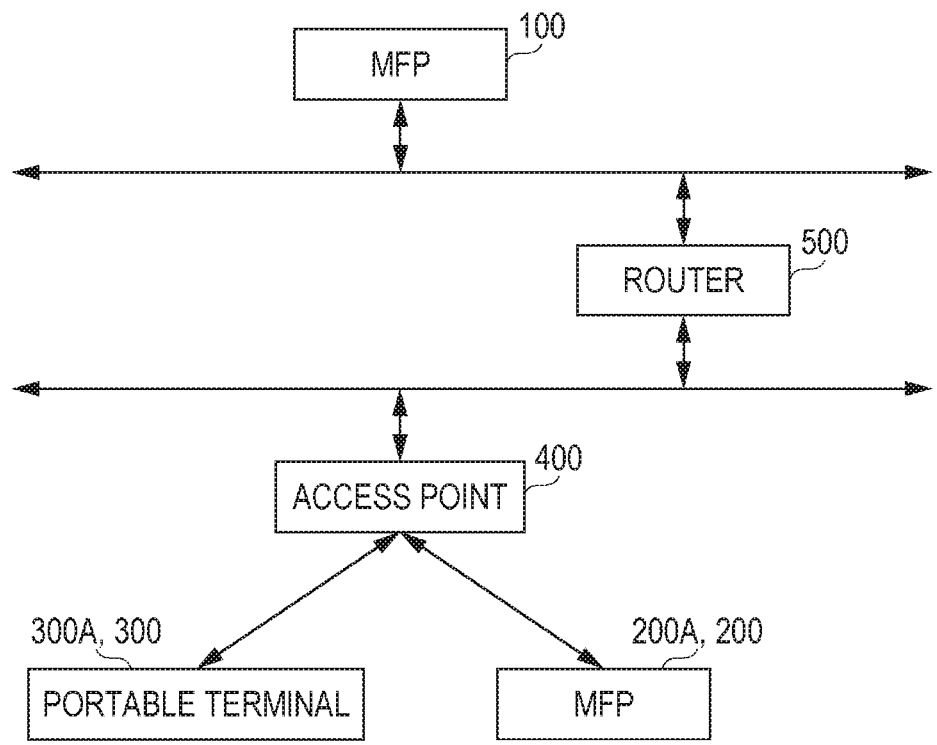
FIG. 4 illustrates an operation example in which a user who does not recognize a network environment uses the print service.

FIG. 4 illustrates an operation example in which a user who does not recognize a network environment uses the print service. A user may not necessarily recognize which MFP is the main apparatus in the network environment. For example, the user is unable to use the print service in the case described below.

The portable terminal 300A is connected to the MFP 200A (sub apparatus) by authenticating the access point 400 with a service set identifier (SSID) as illustrated in FIG. 4.

The MFP 200A (sub apparatus) is connected to the MFP 100 (main apparatus) via the access point 400 and a router 500. In this case, the portable terminal 300A performs automatic search through broadcasting by determining whether an MFP is present over the same network. Referring to FIG. 4, an MFP 200A (sub apparatus) is present but the MFP 100 (main apparatus) is not present between the portable terminal 300A and the router 500. For this reason, through the automatic search, the portable terminal 300A may find the MFP 200A (sub apparatus) but may not find the MFP 100 (main apparatus). In other words, the user has displayed a list of multiple MFPs on the portable terminal 300A, but the list does not include the MFP 100 as a main apparatus. In this state, the user is unable to use the print service.

If the user recognizes the network environment, such as identification information (host name, IP address, and the like) of the MFP 100 (main apparatus), the user is able to use the print service.

Figure 5:
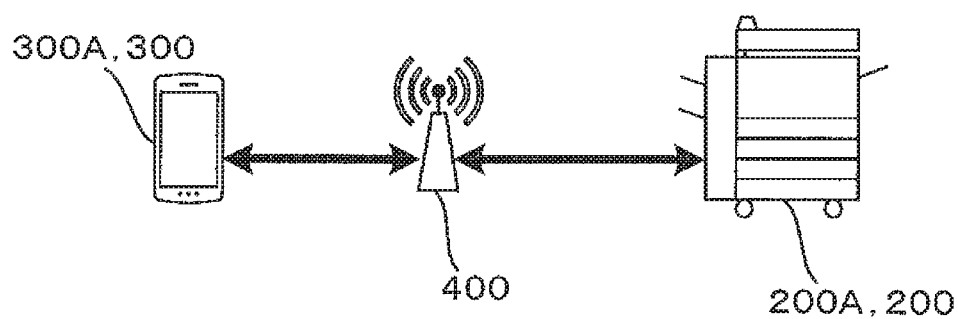
FIG. 5 illustrates the print service in the print system of the first embodiment.
Figure 6:
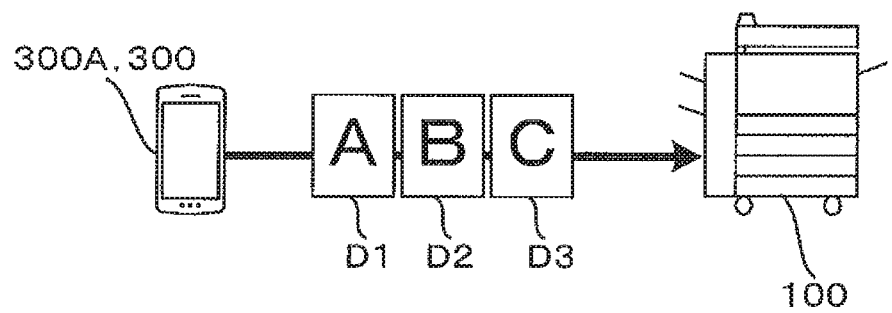
FIG. 6 illustrates the print service in the print system of the first embodiment.
Figure 7:
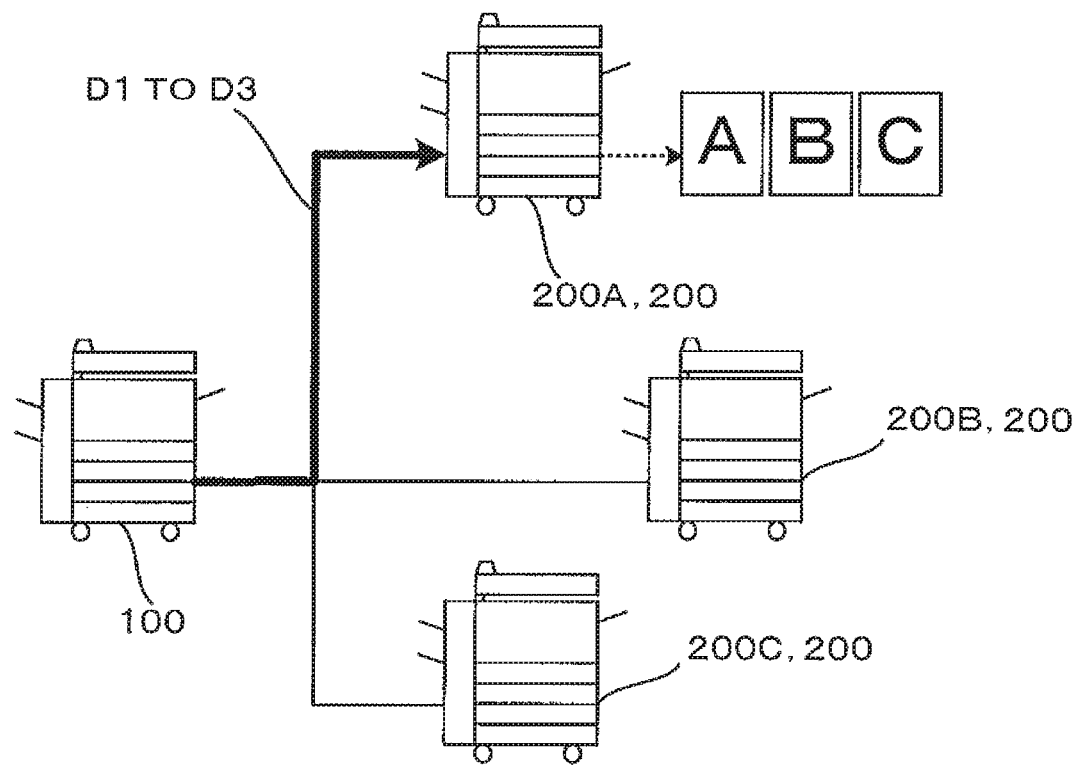
FIG. 7 illustrates the print service of the print system of the first embodiment.

FIG. 5 through FIG. 7 illustrate a print service in the print system of the first embodiment. Even if the user does not recognize which MFP is a main apparatus in the network environment, the user may still be able to use the print service.

In order to store a print job on the main apparatus through the print service as illustrated in FIG. 5, the user authenticates the access point 400 in accordance with SSID using the user terminal 300 (the portable terminal 300A), and connects the portable terminal 300A to the MFP 200A (sub apparatus). The portable terminal 300A then transmits to the MFP 200A (sub apparatus) enquiry information enquiring of the IP address of the MFP 100 (main apparatus). In response to the enquiry information, the MFP 200A (sub apparatus) transmits to the portable terminal 300A address information representing the IP address of the MFP 100 (main apparatus). When the user uses the print service using the portable terminal 300A, the portable terminal 300A may acquire the IP address of the MFP 100 (main apparatus) if the print service is active on a target MFP (such as the MFP 200A) and the target MFP is configured to be a sub apparatus. More specifically, the user does not necessarily have to be aware that the portable terminal 300A has performed an acquisition process of the IP address of the main apparatus.

Referring to FIG. 6, the portable terminal 300A transmits to the IP address of the MFP 100 (main apparatus) the user information (such as a user ID and password), and the print data D1, D2, and D3 in response to the address information from the MFP 200A (sub apparatus). The MFP 100 (main apparatus) stores the user information and the print data D1, D2, and D3 from the user terminal 300 (the portable terminal 300A) as a print job.

In order to perform a print job on the sub apparatus through the print service, the user moves to the location where the MFP 200A (sub apparatus) is installed, and then logs in on the MFP 100 (main apparatus) from the MFP 200A (sub apparatus). In this case, the user inputs the user information (the user ID and password) to the MFP 200A (sub apparatus), and the MFP 200A (sub apparatus) checks the input user information with the user information stored on the MFP 100 (main apparatus) for authentication. The MFP 200A (sub apparatus) acquires from the MFP 100 (main apparatus) the print job in which the input user information matches the user information stored on the MFP 100 (main apparatus), and displays the acquired print job. The user issues a print command to cause the print job to be performed, and the MFP 200A (sub apparatus) prints the print data D1, D2, and D3 in response to the print command as illustrated in FIG. 7. In the authentication operation, the sub apparatus logs in on the main apparatus. The disclosure is not limited to this method. If an authentication server is separately installed, each of the main apparatus and the sub apparatus may use the authentication server. If the authentication operation is performed within the MFP, the same authentication table may be configured in both the main apparatus and sub apparatus.

1.3 Functional Configuration

The functional configuration of each apparatus is described with reference to drawings.

1.3.1 MFP 100 (Main Apparatus)

Figure 8:
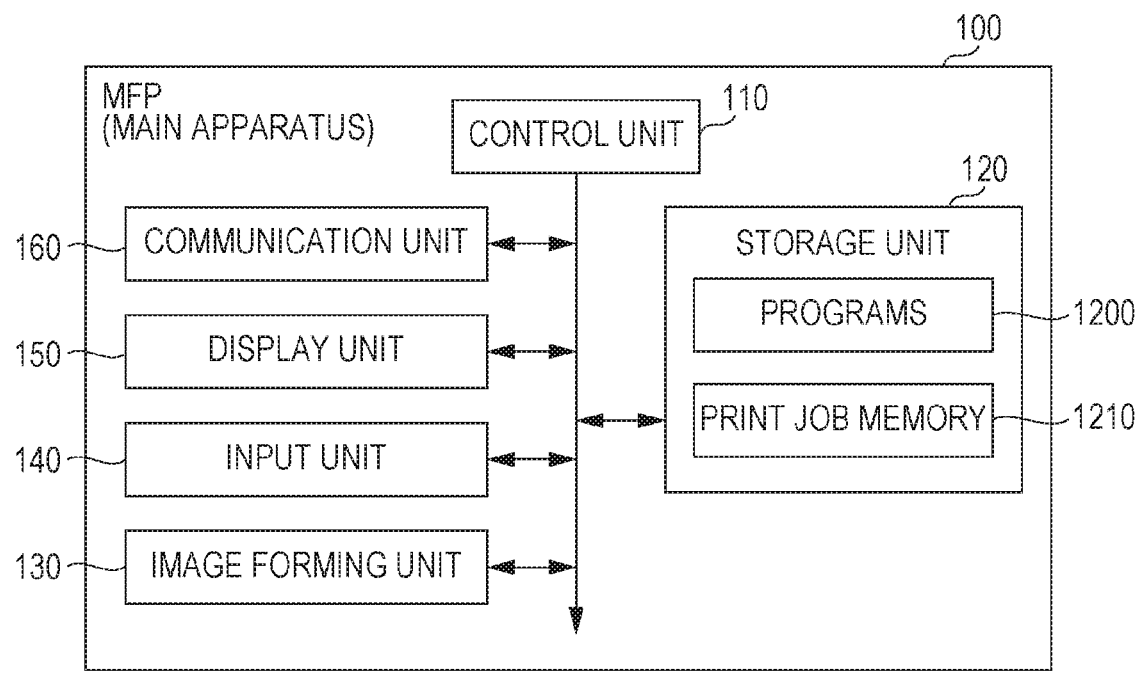
FIG. 8 is a block diagram illustrating a functional configuration of a multifunction peripheral/printer (MFP) (main apparatus) in the print system of the first embodiment.

FIG. 8 is a block diagram illustrating a functional configuration of the MFP 100 (main apparatus) in the print system of the first embodiment. Referring to FIG. 8, the MFP 100 (main apparatus) includes a control unit 110, a storage unit 120, an image forming unit 130, an input unit 140, a display unit 150, and a communication unit 160.

The storage unit 120 is a functional unit that stores a variety of programs 1200 used to operate the MFP 100 (main apparatus) and a variety of data. The storage unit 120 includes a semiconductor memory, a hard disk drive (HDD), or the like. The variety of programs 1200 includes a program that implements the print service. The storage unit 120 also includes a print job memory 1210.

The control unit 110 is a functional unit that generally controls the MFP 100 (main apparatus). The control unit 110 implements a variety of function by reading and executing the variety of programs 1200 stored on the storage unit 120. For example, the control unit 110 includes a central processing unit (CPU).

The image forming unit 130 implements a copying function, a facsimile function, and the like. In response to a print command, the image forming unit 130 prints print data.

The display unit 150 is a liquid-crystal display (LCD). The input unit 140 may be a touchpanel overlaid on the display unit 150, for example.

The communication unit 160 is a functional unit through which the MFP 100 (main apparatus) communicates with MFPs 200A, 200B, and 200C (sub apparatuses), and the user terminal 300 (the portable terminal 300A or the PC 300B) via the network NW.

Figures 9, 10:
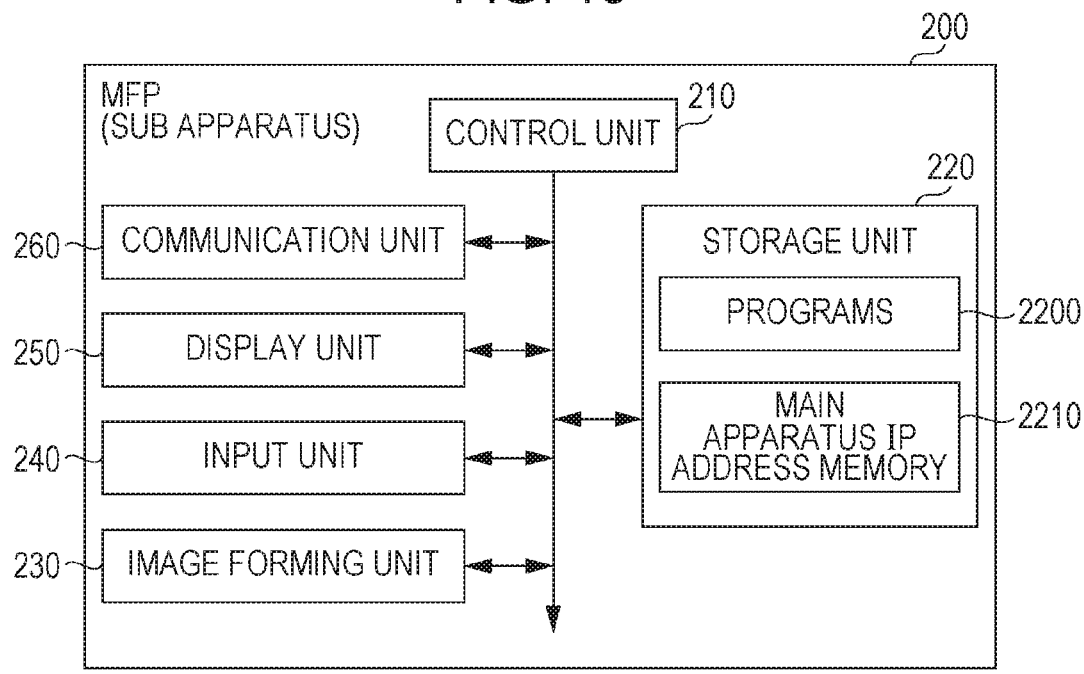
FIG. 9 is a block diagram illustrating a print job memory of the MFP (main apparatus) in the print system of the first embodiment.
FIG. 10 is a block diagram illustrating a functional configuration of an MFP (sub apparatus) in the print system of the first embodiment.

FIG. 9 is a block diagram illustrating a print job memory 1210 of the MFP 100 (main apparatus) in the print system of the first embodiment. The print job including the user information (the user ID, and password, for example), the print data, and time and date is stored on the print job memory 1210. The time and date indicate when the print job is stored. For example, at time and date "2016/5/20/11:00", the user information including the user ID "ID001", password "AAAAA", and print data D1, D2, and D3 is stored on the print job memory 1210. Also, at time and date "2016/5/20/12:00", the user information including the user ID "ID002", password "BBBBB", and print data D10 is stored on the print job memory 1210. At time and date "2016/5/20/13:00", the user information including the user ID "ID003", password "CCCCC", and print data D20 is stored on the print job memory 1210.

1.3.2 MFP 200 (Sub Apparatus)

FIG. 10 is a block diagram illustrating a functional configuration of the MFP 200 (sub apparatus) in the print system of the first embodiment. Referring to FIG. 10, the MFP 200 (sub apparatus) includes a control unit 210, a storage unit 220, an image forming unit 230, an input unit 240, a display unit 250, and a communication unit 260.

The storage unit 220 is a functional unit that stores a variety of programs 2200 to operate the MFP 200 (sub apparatus) and a variety of data. The storage unit 220 includes a semiconductor memory, an HDD, or the like. The programs 2200 include a program that implements the print service.

The control unit 210 is a functional unit that generally controls the MFP 200 (sub apparatus). The control unit 210 implements a variety of function by reading and executing the programs 2200 stored on the storage unit 220. The control unit 210 includes a CPU, for example.

The image forming unit 230 implements a copy function, a facsimile function, and other functions. The image forming unit 230 prints print data in response to a print command.

The display unit 250 is an LCD, for example. The input unit 240 may be a touchpanel overlaid on the display unit 250.

The communication unit 260 is a functional unit through which the MFP 200 (sub apparatus) communicates with the MFP 100 (main apparatus) or the user terminal 300 (the portable terminal 300A or the PC 300B) via the network NW.

Figure 11:
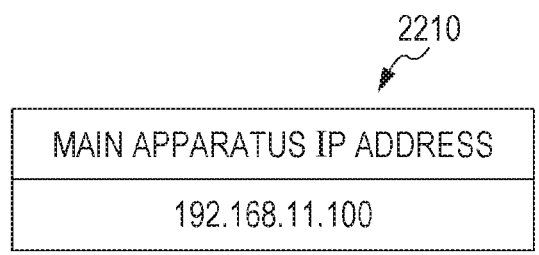
FIG. 11 is a block diagram illustrating a main apparatus IP address memory of the MFP (sub apparatus) in the print system of the first embodiment.

The storage unit 220 includes a main apparatus IP address memory 2210. FIG. 11 is a block diagram illustrating a main apparatus IP address memory 2210 of the MFP 200 (sub apparatus) in the print system of the first embodiment. If the MFP 100 is configured to be a main apparatus with the MFP 200 configured to be a sub apparatus, "192.168.11.100" is configured (registered) as an IP address of the MFP 100 (main apparatus) on the main apparatus IP address memory 2210.

1.3.3 User Terminal 300

Figure 12:
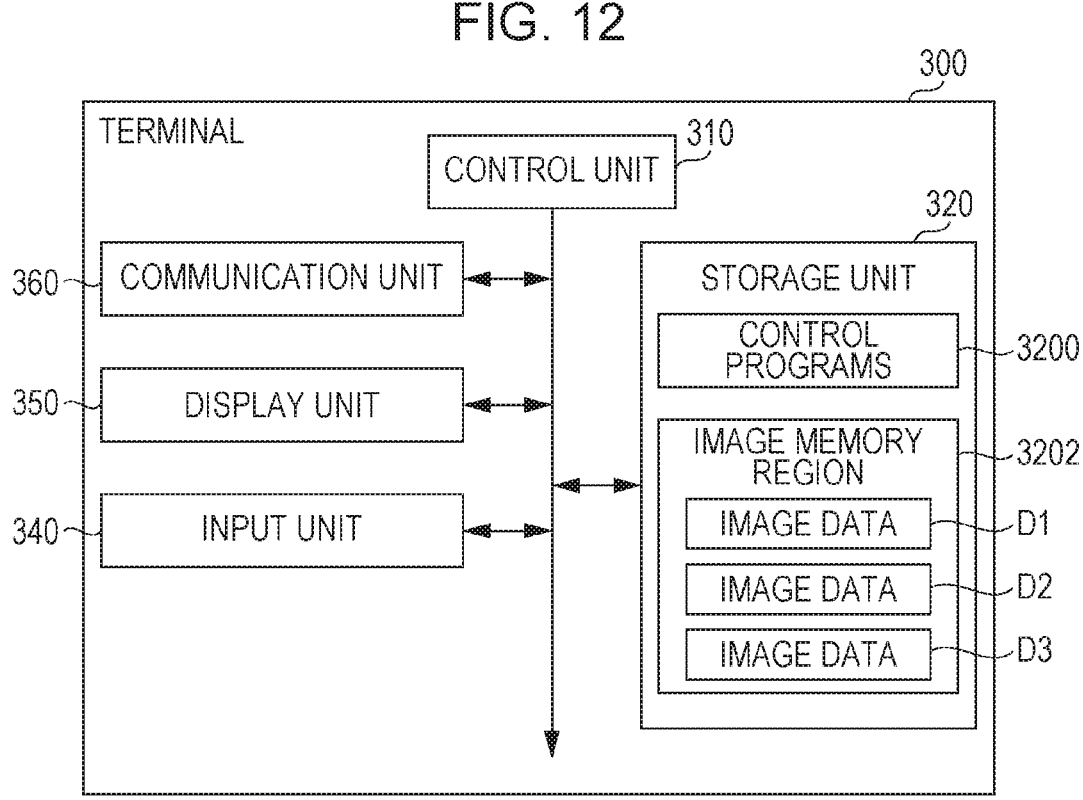
FIG. 12 is a block diagram illustrating a functional configuration of a user terminal in the print system of the first embodiment.

FIG. 12 is a block diagram illustrating a functional configuration of the user terminal 300 in the print system of the first embodiment. Referring to FIG. 12, the user terminal 300 includes a control unit 310, a storage unit 320, an input unit 340, a display unit 350, and a communication unit 360.

The storage unit 320 is a functional unit that stores a variety of programs 3200 to operate the user terminal 300 and a variety of data. The storage unit 320 may include a semiconductor memory, an HDD, or the like.

The control unit 310 is a functional unit that generally controls the user terminal 300. The control unit 310 implements a variety of functions by reading and executing a variety of programs 3200 stored on the storage unit 320. The control unit 310 may include a CPU, for example.

The display unit 350 may be an LCD, for example. If the user terminal 300 is the portable terminal 300A, the input unit 340 may be a touchpanel laid on the display unit 350. If the user terminal 300 is the PC 300B, the input unit 340 may include a pointing device, such as a mouse, and a keyboard that is operable with keys.

The communication unit 360 is a functional unit through which the user terminal 300 communicates with the MFP 100 (main apparatus) and the MFP 200 (sub apparatus) via the network NW.

The storage unit 320 includes an image memory region 3202 that stores the print data. For example, if the user terminal 300 is the portable terminal 300A that is used by the user having a user ID "ID001", the print data D1, D2, and D3 are stored on the image memory region 3202.

1.4 Process Flow

The process flow of the first embodiment is described with reference to drawings.

1.4.1 Main Apparatus Configuration Process

Figure 13:
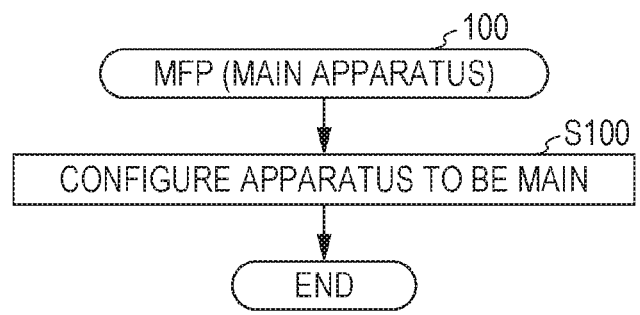
FIG. 13 is a flowchart illustrating a main apparatus configuration process to implement the print service of the print system of the first embodiment.

FIG. 13 is a flowchart illustrating a main apparatus configuration process to implement the print service of the print system of the first embodiment. Referring to FIG. 13, the MFP 100 is configured to be a main apparatus (step S100).

Figure 14:
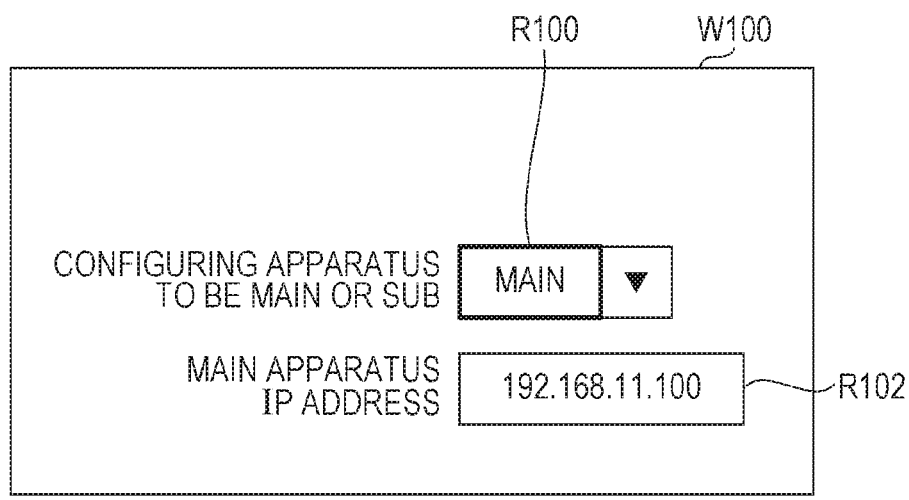
FIG. 14 illustrates the main apparatus configuration process of FIG. 13.

The main apparatus configuration process is described with reference to screen examples. FIG. 14 illustrates the main apparatus configuration process of FIG. 13. Referring to FIG. 14, in response to an operation by the user, the control unit 110 of the MFP 100 displays on the display unit 150 a configuration screen W100 on which the print service on the MFP 100 is available. The configuration screen W100 includes a selection box R100 and an input box R102. The selection box R100 is used in a pull-down manner to select whether to configure the MFP 100 to be a main apparatus or a sub apparatus. The input box R102 is used to input the IP address of the main apparatus if the sub apparatus is selected in the selection box R100. In order to configure the MFP 100 to be a main apparatus, the user selects the main apparatus in the selection box R100 of the configuration screen W100. In such a case, the control unit 110 of the MFP 100 may display "192.168.11.100" as the IP address of the main apparatus (MFP 100) in the input box R102 of the configuration screen W100.

1.4.2 Sub Apparatus Configuration Process

Figure 15:
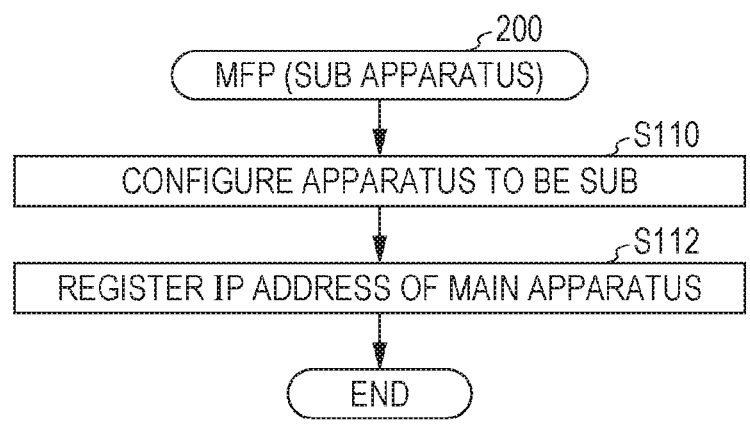
FIG. 15 is a flowchart illustrating a sub apparatus configuration process to implement the print service of the print system of the first embodiment.

FIG. 15 is a flowchart illustrating a sub apparatus configuration process to implement the print service of the print system of the first embodiment. Referring to FIG. 15, MFPs 200A, 200B, and 200C are configured to be sub apparatuses (step S110). In this case, the control unit 210 of each of MFPs 200A, 200B, and 200C (sub apparatuses) registers IP address "192.168.11.100" of the MFP 100 (main apparatus) on the main apparatus IP address memory 2210 (step S112).

Figure 16:
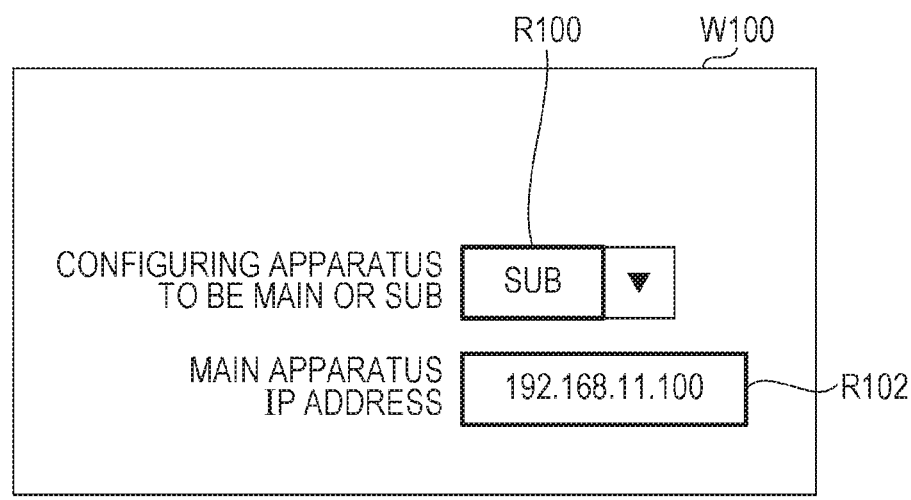
FIG. 16 illustrates the sub apparatus configuration process of FIG. 15.

The sub apparatus configuration process is described with reference to screen examples. FIG. 16 illustrates the sub apparatus configuration process of FIG. 15. Referring to FIG. 16, in response to an operation by the user, the control unit 210 of each of the MFPs 200 (MFPs 200A, 200B, and 200C) displays on the display unit 250 the configuration screen W100 to use the print service on the MFP 200. In order to configure the MFP 200 to be a sub apparatus, the user selects a "sub apparatus" in the selection box R100 of the configuration screen W100 and inputs an IP address "192.168.11.100" of the main apparatus (MFP 100) in the input box R102 of the configuration screen W100.

1.4.3 Image Storage Process

Figure 17:
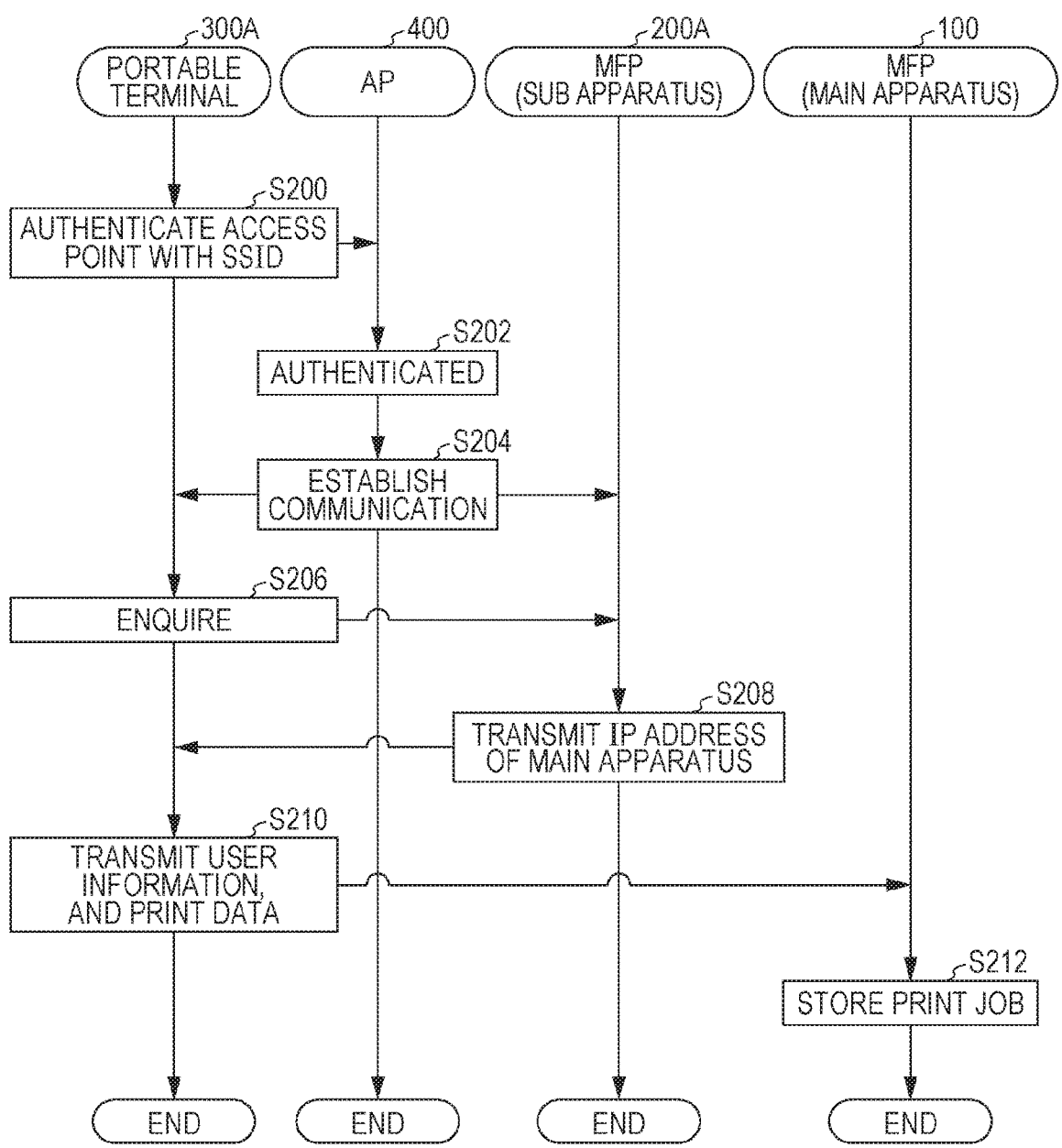
FIG. 17 is a flowchart illustrating an image storage process of the print system of the first embodiment.

FIG. 17 is a flowchart illustrating an image storage process of the print system of the first embodiment. In the image storage process, the print job is stored on the main apparatus using the print service. If the user does not recognize the main apparatus in the network environment, the control unit 310 of the portable terminal 300A authenticates the access point 400 (AP 400 in FIG. 17) with SSID in response to an operation by the user (step S200). If the authentication operation with SSID indicates a match (step S202), communication is established between the portable terminal 300A and the access point 400, and the portable terminal 300A is connected to the MFP 200A (sub apparatus) (step S204).

The control unit 310 in the portable terminal 300A transmits to the MFP 200A (sub apparatus) enquiry information enquiring of the IP address of the MFP 100 (main apparatus) (step S206). In response to the enquiry information, the control unit 210 in the MFP 200A (sub apparatus) transmits, to the portable terminal 300A, address information representing the IP address of the MFP 100 (main apparatus) (step S208). In response to the address information, the control unit 310 in the portable terminal 300A transmits, to the IP address of the MFP 100 (main apparatus), the user information (user ID "ID001", and password "AAAAA"), and the print data D1, D2, and D3 (step S210). The control unit 110 in the MFP 100 (main apparatus) stores on the print job memory 1210 the user information (user ID "ID001", and password "AAAAA"), and the print data D1, D2, and D3 as a print job (step S212). When the user uses the print service on the portable terminal 300A in each of steps S206 and S208, the portable terminal 300A may acquire the IP address of the MFP 100 (main apparatus) if the print service is active on a target MFP (such as the MFP 200A) and the target MFP is configured to be a sub apparatus. More specifically, the user does not necessarily have to be aware that the portable terminal 300A has performed an acquisition process of the IP address of the main apparatus.

1.4.4 Print Process

Figure 18:
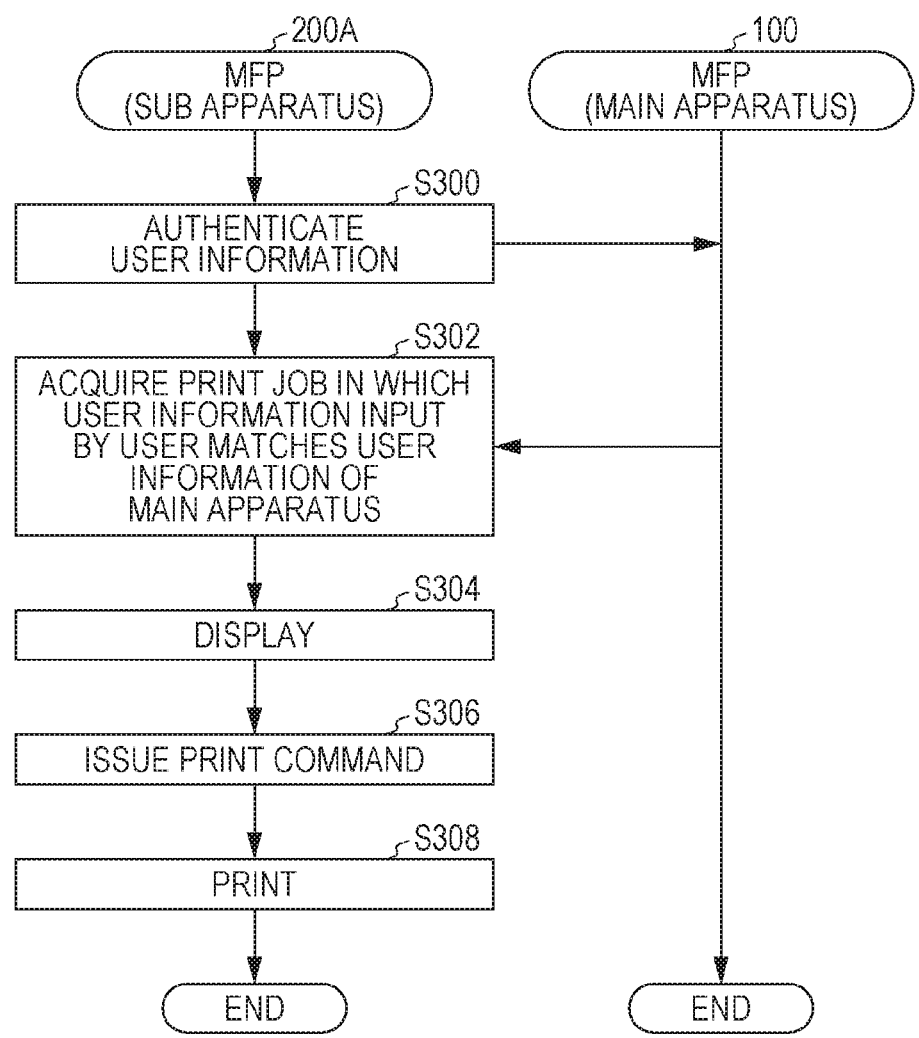
FIG. 18 is a flowchart illustrating a print process of the print system of the first embodiment.

FIG. 18 is a flowchart illustrating a print process of the print system of the first embodiment. In the print process, the sub apparatus performs the print job using the print service. The user moves to the location where the MFP 200A (sub apparatus) is installed, and logs in on the MFP 100 (main apparatus) from the MFP 200A (sub apparatus). In this case, in response to an operation by the user, the control unit 210 in the MFP 200A (sub apparatus) inputs the user information (user ID "ID001", and password "AAAAA"). In this case, the control unit 210 in the MFP 200A (sub apparatus) checks the user information (user ID "ID001" and password "AAAAA") input by the user against the user information stored on the MFP 100 (main apparatus) for authentication (step S300). In the authentication operation, the sub apparatus logs in on the main apparatus. The disclosure is not limited to this method. If an authentication server is separately installed, each of the main apparatus and the sub apparatus may use the authentication server. If the authentication operation is performed within the MFP, the same authentication table may be configured in both the main apparatus and sub apparatus.

If the authentication operation results in a match, the control unit 210 in the MFP 200A (sub apparatus) acquires from the MFP 100 (main apparatus) the print job (the time and date "2016/5/20/11:00", the user information, and the print data D1, D2, and D3) when the user information (the user ID "ID001" and the password "AAAAA") input by the user matches the user information stored on the MFP 100 (main apparatus) (step S302), and displays the print job on the display unit 250 (step S304). If the user issues a print command for the print job (step S306), the control unit 210 in the MFP 200A (sub apparatus) prints the print data D1, D2, and D3 in response to the print command (step S308). The control unit 210 in the MFP 200A (sub apparatus) stores on the storage unit 220 a record of the print job as log information.

In accordance with the first embodiment, the print data D1, D2, and D3 are printed in response to the print command. Alternatively, the print data D1, D2, and D3 may be output to a universal serial bus (USB) memory.

Step S206 may not necessarily have to be performed in the image storage process in the first embodiment. More specifically, when the portable terminal 300A is connected to the MFP 200A (sub apparatus) (step S204), the control unit 210 in the MFP 200A (sub apparatus) may transmit to the portable terminal 300A the address information representing the IP address of the MFP 100 (main apparatus) (step S208).

As described above, the print system of the first embodiment includes the user terminal 300 (portable terminal 300A) and the multiple image forming apparatuses (the MFPs 100 and 200), connected to the network NW. The print service is available in the print system as described below. The user terminal 300 (portable terminal 300A) transmits the print job to the apparatus (MFP 100), which is configured to be a main apparatus from among the multiple image forming apparatuses (MFPs 100 and 200), in accordance with the identification information (IP address) of the main image forming apparatus (MFP 100). The main apparatus (MFP 100) stores the print job from the user terminal 300 (portable terminal 300A). The image forming apparatus (MFP 200), which is configured to be a sub apparatus from among the multiple image forming apparatuses (MFPs 100 and 200), performs the print job stored on the main apparatus (MFP 100). The user terminal 300 (portable terminal 300A) includes an enquiry information transmission control unit (control unit 310) that transmits to the sub apparatus (MFP 200) enquiry information to enquire of the identification information (IP address) of the main apparatus (MFP 100) when the print service is used. The sub apparatus (MFP 200) includes an identification information configuration memory (the main apparatus IP address memory 2210) and an identification information transmission control unit (control unit 210). The identification information configuration memory (the main apparatus IP address memory 2210) stores the identification information (IP address). The identification information transmission control unit (control unit 210) transmits to the user terminal (portable terminal 300A) the identification information (IP address) stored on the identification information configuration memory (the main apparatus IP address memory 2210) in response to the enquiry information from the user terminal (portable terminal 300A).

In the print system of the first embodiment, the print job includes the user information (user ID and password) used to authenticate the user, and the print data D1, D2, and D3. The sub apparatus (MFP 200A) includes a print job acquisition control unit (control unit 210) and a print data output control unit (control unit 210). The print job acquisition control unit (control unit 210) acquires from the main apparatus (MFP 100) the print job in which the user information input by the user matches the user information stored on the main apparatus (MFP 100) when the user inputs the user information (user ID and password). The print data output control unit (control unit 210) outputs the print data D1, D2, and D3 when a print command is issued for the print job acquired from the main apparatus (MFP 100).

Even if the user does not recognize the network environment in the print system of the first embodiment as described above, the print service is available in the print system as described below. The user terminal (portable terminal 300A) transmits to the main apparatus (MFP 100) the print job in accordance with the IP address of the main apparatus (MFP 100). The main apparatus (MFP 100) stores the print job from the user terminal (portable terminal 300A). The sub apparatus (MFP 200A) performs the print job stored on the main apparatus (MFP 100).

The portable terminal 300A has been described as a user terminal. The user terminal is not limited to the portable terminal 300A. The user terminal may be a personal computer (PC) that commands a printer driver to perform the print job. The identification information of the main apparatus (MFP 100) is the IP address, but the identification information is not limited to the IP address. The identification information may be a media access control (MAC) address. SSID is used to authenticate the user. Alternatively, a one-time password may be used. In such a case, an effect similar to the effect of the first embodiment is obtained.

2. Second Embodiment

Figure 19:
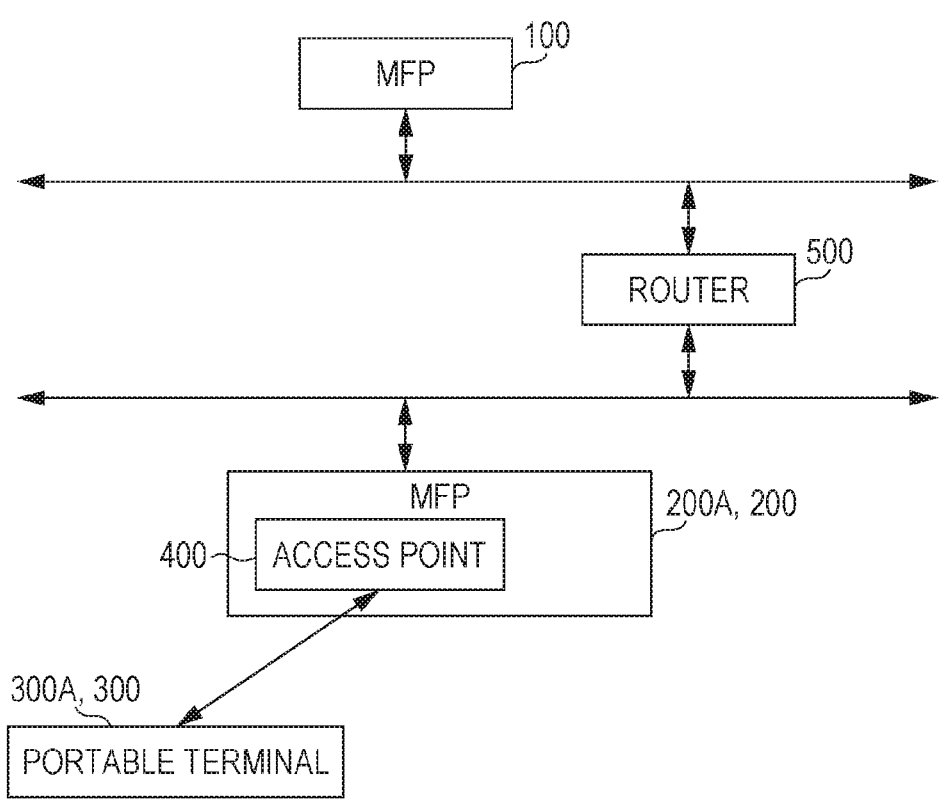
FIG. 19 illustrates a print system of a second embodiment.

In accordance with the first embodiment, the portable terminal 300A is connected to the MFP 200 (sub apparatus)

via the access point 400. The disclosure is not limited to this method. Referring to FIG. 19, in accordance with a second embodiment, the function of the access point 400 may be imparted to the MFP 200A (sub apparatus). The MFP 200A (sub apparatus) may be set up beside a reception desk and used when a guest is coming.

3. Third Embodiment

Figures 20, 21:
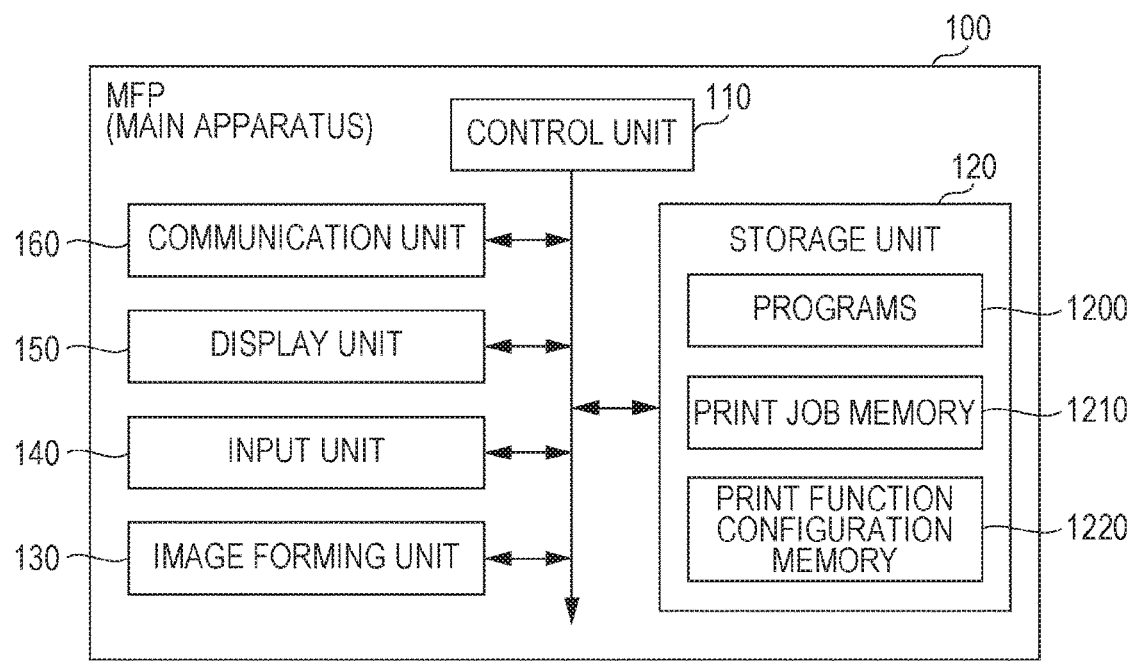
FIG. 20 is a block diagram illustrating a functional configuration of an MFP (main apparatus) of a print system of a third embodiment.
FIG. 21 illustrates a print function configuration memory of the MFP (main apparatus) of the third embodiment.

FIG. 20 is a block diagram illustrating the functional configuration of an MFP 100 (main apparatus) in a print system of a third embodiment. Referring to FIG. 20, the storage unit 120 in the MFP 100 (main apparatus) further includes a print function configuration memory 1220. FIG. 21 illustrates the print function configuration memory 1220 in the MFP 100 (main apparatus) of the third embodiment. The print function configuration memory 1220 stores IP addresses and print functions of multiple MFPs 100, 200A, 200B, and 200C. When the control unit 210 in the MFP 200A (sub apparatus) acquires the print job from the MFP 100 (main apparatus), the control unit 210 in the MFP 200A (sub apparatus) presents to the user the print functions of the MFPs 100, 200A, 200B, and 200C stored on the print function configuration memory 1220 in the MFP 100 (main apparatus) (on the display unit 250 in this case), and allows the user to select an MFP that implements a desired print function. For example, the user may select an MFP (MFP 200B, for example) to implement color printing if the user wants to print the print data D1, D2, and D3 in color.

4. Fourth Embodiment

Figure 22:
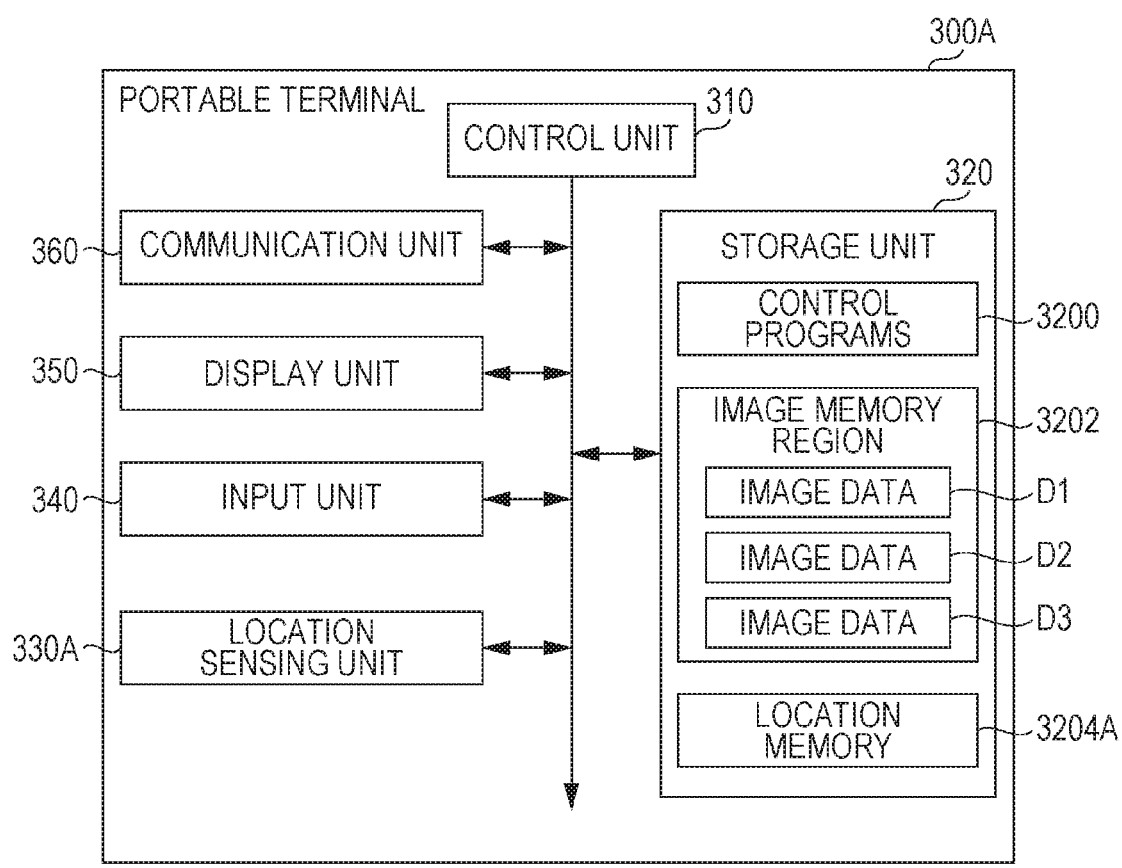
FIG. 22 is a block diagram illustrating a functional configuration of a user terminal (portable terminal) in a print system of a fourth embodiment.

In accordance with the first embodiment, the portable terminal 300A communicates with the MFP 200A (sub apparatus) via the access point 400. The disclosure is not limited to this configuration. In a fourth embodiment as illustrated in FIG. 22, the storage unit 320 in the portable terminal 300A includes a location memory 3204A that stores locations of the MFPs 100, 200A, 200B, and 200C, and the portable terminal 300A further includes a location sensing unit 330A that detects the location thereof using an electric field strength or sound. The control unit 310 in the portable terminal 300A may communicate with one of the MFPs 100, 200A, 200B, and 200C that is closest to the location of the portable terminal 300A. In this case, SSID may be used. The user thus recognizes the MFP that is closest to the location of the portable terminal 300A in the network environment.

5. Fifth Embodiment

In accordance with the first embodiment, the MFP 100 is configured to be a main apparatus, and MFPs 200A, 200B, and 200C are configured to be sub apparatuses. The disclosure is not limited to this configuration. The main apparatus and the sub apparatus are interchangeable. The MFP 100 may be configured to be a sub apparatus, and the MFP 200C may be configured to be a main apparatus. The user may cause a sub apparatus (MFP 200C, for example) to the print data D1, D2, and D3 to be stored on using the portable terminal 300A, and cause the main apparatus (MFP 100) to print the print data D1, D2, and D3 using the sub apparatus (MFP 200C).

6. Modifications

The disclosure is not limited to the above-described embodiments, and a variety of modifications is possible without departing from the scope of the disclosure. An embodiment resulting from modifying and combining elements of the above-described embodiments may fall within the scope of the disclosure.

The above-described embodiments may be combined in use in a way that has not been described as long as such a combination is not contradictory to the discussion of the embodiments.

A program operating on each apparatus of the embodiments controls a central processing unit (CPU) (causes a computer to operate) to implement the function of each of the above-described embodiments. Information handled in each apparatus is temporarily stored on a temporary storage device (such as a random-access memory (RAM)), and then stored on a variety of read-only memories (ROMs), or a hard disc drive (HDD), and read, modified, and then re-written by the CPU as appropriate.

Recording media storing the program may include a semiconductor memory (such as ROM, or a non-volatile memory card), an optical recording medium, a magneto-optical recording medium (such as a digital versatile disc (DVD), a magneto-optical (MO) disc, a mini disc (MD), compact disc (CD), or Blu-ray disc (BD)), and a magnetic recording medium (such as a magnetic tape, or a flexible disc). The functions of the embodiments are implemented by executing the loaded program. The functions of the embodiments may also be implemented in cooperation with an operating system or another application program in response to an instruction from the program.

In order to distribute the program in the market, the program may be stored on a portable recording medium, or may be transmitted to a server computer via a network, such as the Internet. In such a case, a storage device in the server computer falls within the scope of the disclosure.

Part or whole of each apparatus of the embodiments is typically implemented by a large scale integration (LSI) as an integrated circuit. The functional blocks of each apparatus may be individually mounted on a chip or part or whole of the functional blocks may be integrated onto a chip. The circuit integration is not limited to the LSI. The circuit integration may be performed using a dedicated circuit or a general-purpose processor. If a technique of circuit integration substituting for the LSI emerges as the semiconductor technique advances, an integrated circuit based on the emerged technique may also be used.

The present disclosure contains subject matter related to that disclosed in Japanese Priority Patent Application JP 2016-148349 filed in the Japan Patent Office on Jul. 28, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus configured to be a sub apparatus in a print system, the print system providing a print service and including a user terminal and a plurality of image forming apparatuses, connected to a network, the user terminal transmitting to an image forming apparatus configured to be a main apparatus a print job in accordance with identification information of the main apparatus from among the image forming apparatuses, the main apparatus storing the print job from the user terminal, the image forming apparatus configured to be the sub apparatus from among the image forming apparatuses performing the print job stored on the main apparatus, the image forming apparatus configured to be the sub apparatus, comprising:
an identification information configuration memory that stores the identification information of the main apparatus storing the print job from the user terminal; and
an identification information transmission control unit that transmits to the user terminal the identification information stored on the identification information configuration memory when the print service is used.

2. The image forming apparatus according to claim 1, wherein the print job includes print data and user information to authenticate a user, and
wherein the image forming apparatus configured to be the sub apparatus, further comprises:
a print job acquisition control unit that, when the user inputs the user information, acquires from the main apparatus the print job in which the user information stored on the main apparatus matches the user information input by the user; and
a print data output control unit that outputs the print data if a print command is issued to perform the print job acquired from the main apparatus.

3. The image forming apparatus according to claim 1, wherein the identification information comprises an IP (Internet protocol) address of the main apparatus.

4. A print system providing a print service and including a user terminal and a plurality of image forming apparatuses, connected to a network, the user terminal transmitting to an image forming apparatus configured to be a main apparatus a print job in accordance with identification information of the main apparatus from among the image forming apparatuses, the main apparatus storing the print job from the user terminal, an image forming apparatus configured to be a sub apparatus from among the image forming apparatuses performing the print job stored on the main apparatuses, the sub apparatus comprising:
an identification information configuration memory that stores the identification information of the main apparatus storing the print job from the user terminal; and
an identification information transmission control unit that transmits to the user terminal the identification information stored on the identification information configuration memory when the print service is used.

5. The print system according to claim 4, wherein the user terminal comprises an enquiry information transmission control unit that transmits, to the sub apparatus, enquiry information to enquire of the identification information of the main apparatus when the print service is used, and
wherein the identification information transmission control unit in the sub apparatus transmits to the user terminal the identification information stored on the identification information configuration memory in response to the enquiry information from the user terminal.

6. The print system according to claim 4, wherein the print job includes print data and user information to authenticate a user, and
wherein the sub apparatus comprises:
a print job acquisition control unit that, when the user inputs the user information, acquires from the main apparatus the print job in which the user information stored on the main apparatus matches the user information input by the user; and
a print data output control unit that outputs the print data if a print command is issued to perform the print job acquired from the main apparatus.

7. The print system according claim 4, wherein the main apparatus comprises a print function configuration memory that stores the identification information and print function of the image forming apparatuses, and
wherein the sub apparatus further comprises a presentation control unit that presents the print function of the image forming apparatuses stored on the print function configuration memory of the main apparatus when the print job is acquired from the main apparatus.

8. The print system according to claim 4, wherein the identification information of the main apparatus comprises an IP (Internet protocol) address of the main apparatus.

9. The print system according claim 4, wherein the user terminal comprises:
a location memory that stores locations of the image forming apparatuses;
a location sensing unit that detects a location of the user terminal; and
a communication control unit that communicates with an image forming apparatus closest to the location of the user terminal from among the image forming apparatuses.

10. The print system according to claim 4, wherein the main apparatus is interchangeable with the sub apparatus.

11. A print method of a print system providing a print service and including a user terminal and a plurality of image forming apparatuses, connected to a network, the user terminal transmitting to an image forming apparatus configured to be a main apparatus a print job in accordance with identification information of the main apparatus from among the image forming apparatuses, the main apparatus storing the print job from the user terminal, an image forming apparatus configured to be a sub apparatus from among the image forming apparatuses performing the print job stored on the main apparatus, the print method, comprising:
storing the identification information of the main apparatus storing the print job from the user terminal; and
transmitting to the user terminal the stored identification information when the print service is used.

* * * * *